United States Patent [19]

Longsdorf et al.

[11] Patent Number: 5,410,730
[45] Date of Patent: Apr. 25, 1995

[54] INTERFACE CONTROLLER FOR MATCHING A PROCESS ADDRESS FIELD FROM A PLURALITY OF FIELDS AND GENERATING A CORRESPONDING DEVICE ADDRESS FIELD

[75] Inventors: Randy J. Longsdorf, Chaska; David L. Pederson, Hopkins, both of Minn.

[73] Assignee: Rosemount Inc., Eden Prairie, Minn.

[21] Appl. No.: 157,982

[22] Filed: Nov. 23, 1993

Related U.S. Application Data

[63] Continuation of Ser. No. 556,036, Jul. 20, 1990, abandoned.

[51] Int. Cl.$^6$ ............................................. G11C 8/00
[52] U.S. Cl. ................................. 395/800; 364/942.6; 364/DIG. 2
[58] Field of Search ............................. 395/600, 800

[56] References Cited

U.S. PATENT DOCUMENTS

| | | | |
|---|---|---|---|
| 3,670,310 | 6/1972 | Bharwani et al. | 395/600 |
| 4,554,631 | 11/1985 | Reddington | 395/600 |
| 4,627,019 | 12/1986 | Ng | 395/600 |
| 4,674,066 | 6/1987 | Kucera | 395/600 |
| 4,817,036 | 3/1989 | Millett et al. | 395/600 |
| 4,821,180 | 4/1989 | Gerety et al. | 395/275 |
| 4,823,306 | 4/1989 | Barbic et al. | 395/600 |
| 4,852,041 | 7/1989 | Nakano | 364/500 |
| 4,855,905 | 8/1989 | Estrada et al. | 395/500 |
| 4,884,287 | 11/1989 | Jones et al. | 375/121 |
| 4,945,473 | 7/1990 | Holtey et al. | 395/500 |
| 4,975,829 | 12/1990 | Clarey et al | 395/275 |
| 5,007,013 | 4/1991 | Elms | 395/200 |

OTHER PUBLICATIONS

Product Data Sheet 2634 for "Series 7500 system V. Hydrostatic Tank Gauging System Software and Tank Scanning Unit (TSU)," Rosemount Inc. 1988.
Document No. 33-07787 for Varex, a Rosemount Division, 6810 Series Tank Scanning Unit—Hardware, Instruction Manual.

Primary Examiner—Parshuiam S. Lall
Assistant Examiner—Krisna Lim
Attorney, Agent, or Firm—Westman, Champlin & Kelly

[57] ABSTRACT

An apparatus receives a query from a process controller containing a process variable address representing a storage location for a process variable in a network of field devices. A communication standard type and an unique field device address is associated with each field device. An associating section identifies a field device address and a communication standard type associated with each of a plurality of process variable addresses. An extracting section matches the stored process variable address with a process variable address in the associating section and extracts the associated field device address and the associated communication standard type from the associating section. A generating section generates a field device request containing the extracted associated field device address as a function of the extracted associated communication standard type. The field device request is conveyable over a communication line to address the storage location represented by the stored process variable address.

19 Claims, 3 Drawing Sheets

INTERFACE CONTROLLER FOR MATCHING A PROCESS ADDRESS FIELD FROM A PLURALITY OF FIELDS AND GENERATING A CORRESPONDING DEVICE ADDRESS FIELD

This is a continuation of application Ser. No. 07/556,036, filed Jul. 20, 1990, now abandoned.

BACKGROUND OF THE INVENTION

Field of the Invention

The present invention relates to a device for converting and coupling outputs representative of process variables from transmitters to a process controller.

In a process control system, a process controller monitors a process by communicating messages with field sensing devices. The field devices are of various types and may communicate with different communications standards. The process controller may communicate with yet another communications standard. When the process controller and a field device type communicate with different standards, a "communicator" provides a translating interface between them.

A communication standard governs both composition and encoding of messages and has a messaging layer and a physical layer. The messaging layer defines a set of rules for combining data structures into a message. A data structure is a grouping of digital bits having a specific meaning. For example, a data structure meaning "read a floating point register" may be defined as binary 01100101. The physical layer, on the other hand, defines a set of rules for encoding the digital bits onto a physical medium such as an interface. The rules specify the AC and DC parameters for encoding each bit, the number of conductors used to encode the bit and associated timing. For example, one physical layer encodes a logic "0" as 0.0 Volts on a wire in an interface. RS-232, RS-422 and RS-485, defined by the Electronics Industry Association, are examples of IEEE serial interface physical layers used by the process control industry.

Process controllers typically communicate in a "MODBUS" messaging layer encoded on an IEEE serial interface layer. The "MODBUS" communications standard is defined in GOULD "MODBUS" PROTOCOL document P1-MUS-300, Rev. B. Field devices use either a "MODBUS" message layer or a Mark-Space message layer, both encoded on a Mark-Space physical layer. The Mark-Space communications standard is used in Varec Division of Emerson Electric products.

Mark-Space communications require two conductors to encode the information while a third conductor is a ground reference. An active low pulse on the first conductor encodes a binary one and an active low pulse on the second conductor encodes a binary zero. There is an off state between any two pulses.

Existing communicators convert and couple messages between a process controller and a single type of field device. In some cases, multiple communicators are needed to couple messages between a process controller and one type of field device. Consequently, at least two types of communicators are interposed between the process controller and two field device types. In the simplest case, one type of communicator interposes between the process controller to field devices messaging in "MODBUS" and a second type interpose between the same process controller and field devices messaging in Mark-Space. Each communicator type requires a separate network of interconnections, impacting cost and connection complexity.

Communicators include a memory loaded with pairs of corresponding "MODBUS" addresses and field device addresses, where the "MODBUS" addresses point to memory locations containing process variables in the corresponding field device. Typically the loading, or configuration of the memory is performed when the process control application is started or modified. These memory contents are loaded via commands from the process controller using special purpose, expensive configuration software.

Furthermore, existing communicators extract commands from incoming messages and validate the command by matching the extracted command to a stored set of commands. Consequently, when the process controller is upgraded to send new commands, the communicator must be redesigned.

Consequently, there is a need for a communicator interposed between both types of field devices and a process controller to minimize connection complexity and cost, yet which is able to support command set upgrades without redesign and easily configured at start-up and modification.

SUMMARY OF THE INVENTION

The present invention relates to a communicator receiving queries from a process controller and directing them to their intended destination in a proper format.

The received query comprises a process variable (PV) address section. Storage control block stores the PV address, which is representative of a storage location for a process variable in a field device (FD). The FD is in a network of FDs where each FD has an FD type and a unique FD address. In associating control block, each of a plurality of FD addresses and the FD type corresponding to such FD address are associated with one PV address corresponding thereto and an output is provided which is representative of a corresponding address pair. Extracting receives the stored PV address from the storing control block and accesses the associating control block, searching through the address pairs and extracting an output containing the FD address and the FD type corresponding to a PV address which matches the stored PV address. Generating control block receive the extracted FD address and FD type and generate a FD request as a function of the FD type comprising the extracted FD address. The FD request is conveyed over a line common to the FDs, to the FD containing the stored PV address location.

The communicator includes a serial interface for coupling to the process controller. In a preferred embodiment, the IEEE serial interface can be RS-232, RS-422 or RS-485. In another embodiment, the communicator includes two IEEE serial interfaces, one RS-232 and another RS-485 or RS-422, either couplable to the process controller. The communicator also has bidirectional echoing control block coupled between the serial interfaces for echoing a query received on the RS-232 interface to the RS-485 interface.

DETAILED DESCRIPTION OF THE PREFERRED EMBODIMENTS

Figure 1:
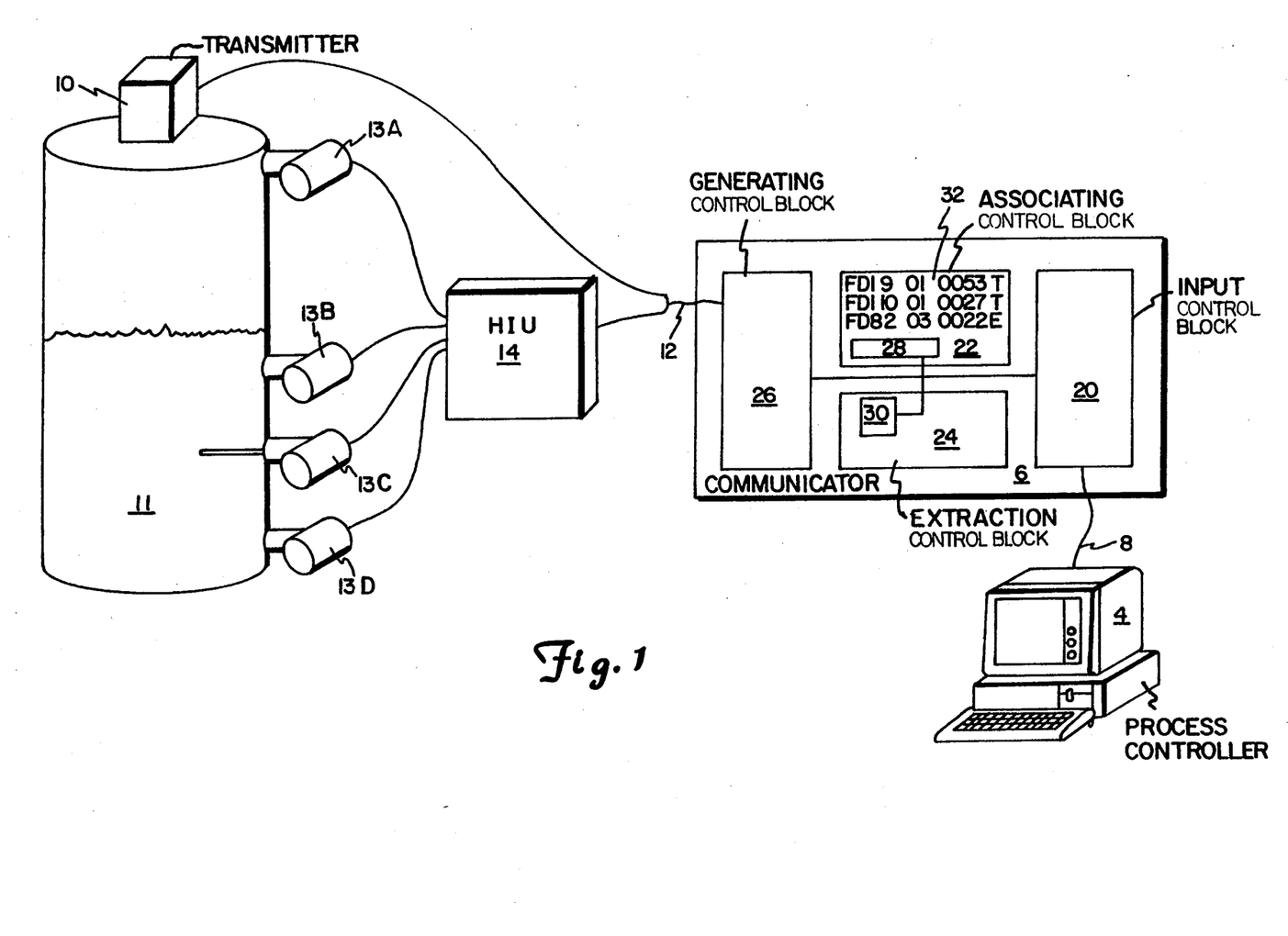
FIG. 1 shows a partial schematic of a segment of a process control application having a communicator, shown in block diagram according to the present invention, FDs and a process controller.

FIG. 1 shows a tank level process control application 2, where process controller 4 sends a process variable query in a first messaging standard to a communicator 6 over a line 8. Communicator 6 communicates with both field device (FD) 10 and 14 over a line 12 using a messaging layer specific to each FD. Although this process control application has two FDs, typical control applications have many more FDs. Process controller 4 sends process variable queries to communicator 6, which addresses one of FDs 10 or 14 in an appropriate way, receives a response containing the desired process variable and transmits it to process controller 4 so that process controller 4 may monitor the fluid level in a tank 11.

FD 10 is a transmitter which senses process variables representative of fluid level and optionally fluid temperature in tank 11. When addressed, FD 10 sends responses containing process variables representative of fluid temperature and level. FD 14 is a Hydrostatic Interface Unit (HIU) which sends responses containing process variables representative of pressure, density, true mass and others derived from signals from transmitters 13A–D in tank 11. FDs 10,14 each have a unique FD network address set internally and respond only when addressed with such address and in an appropriate format. A master-slave relationship exists between communicator 6 and FDs 10,14 because the FDs are exclusively responsive to requests from communicator 6.

Transmitter 10 communicates with communicator 6 in a Mark-Space messaging layer and a Mark-Space physical layer; such communication is called traditional throughout this application. HIU 14 communicates with communicator 6 with both Mark-Space and "MODBUS" messaging layers using a Mark-Space physical layer; such communications are called encapsulated throughout this application because the Mark-Space part of the message surrounds a "MODBUS" part of the message. Process controller 4 communicates with communicator 6 in a "MODBUS" messaging layer on an IEEE serial physical layer such as RS-232, RS-485 or RS-422. Mark-Space physical layer is a serial physical layer since information is transferred one bit at a time. It is not, however, an IEEE standard serial physical layer. In summary, communications between communicator 6 and process controller 4 are in "MODBUS" message layer and on an IEEE serial physical layer. Those between communicator 6 and FDs 10,14 are messaged in either "MODBUS", Mark-Space or both as appropriate and encoded on a Mark-Space physical layer.

Communicator 6 is preferably implemented in microprocessor based circuitry 7 having input control block 20, associating control block 22, extraction control block 24 and generating control block 26. Input control block 20 couples to process controller 4 over line 8, and thereby receives the process variable queries from controller 4. A PV address section is included in each query which is representative of a register storage location containing a process variable in a FD in the network.

For an example, a PV address of 01 0053 represents a process variable stored at register storage location 0053 in FD 1 which is representative of temperature, shown generally at 32. Input control block 20 includes storage control block for storing the PV address. Since traditional field devices lack the flexible register structure that HIU field devices have, communicator 6 creates a pseudo register number for each of the process variables requested from traditional devices. A messaging standard having, as part of a query, a register address representative of a location is a register-based messaging standard.

Generating control block 26 is coupled to line 12, which carries process variable requests from communicator 6 to FDs 10,14 on a Mark-Space physical layer. The PV requests are formatted in traditional or encapsulated format, depending on the device type. A large number of FDs, 48 for example, can couple to line 12.

Associating control block 22 includes corresponding pairs of FD addresses and PV addresses. The device type of the FD at each FD address is also recorded. The FD address, the PV address and device type, are shown generally at 32. The first line shows the PV address as "01 0053" the FD address as "FD 9" and the FD type as "T", where T indicates that the device type is traditional. Process variable storage 28 stores the most recent process variable retrieved from each FD stored in associating control block 22. Process variables from FDs using traditional communications are converted to encapsulated messages before storing in storage 28 process variables from FDs communicating in encapsulated messages are not. Associating control block 22 are preferably realized in a non-volatile memory, since such memory is substantially unaffected by power fluctuations. The memory may be an integral part of the microprocessor or may be external.

The first column in TABLE 1 shows a set of variable names, the values for which are stored in associating control block 22 for each FD coupled to communicator 6. The remaining columns represent the memory locations in associating control block 22 containing values for each variable in each of the 48 sets of the variable names. For example, if transmitter 10 were assigned FD number 1, the location of its first integer register would be stored in associating control block memory location 104. TABLE 2 describes most of the variables from TABLE 1 and gives allowed values, if appropriate. The variables not discussed in TABLE 2 (Traditional Zero and Full Scale, for temperature and level measurements) are used by conversion means within extraction means 24 and are discussed below. Process variable storage 28 stores the most recent process variable retrieved from each FD stored in associating control block 22. Thus, associated circuitry 22 is itself a memory containing a lookup table for each FD, setting forth the FD address, PV address, and device type, as indicated at 32, as well as the variables set forth in TABLE 2. The PV address stored in the input control block functions as a pointer into this lookup table.

Figure 2:
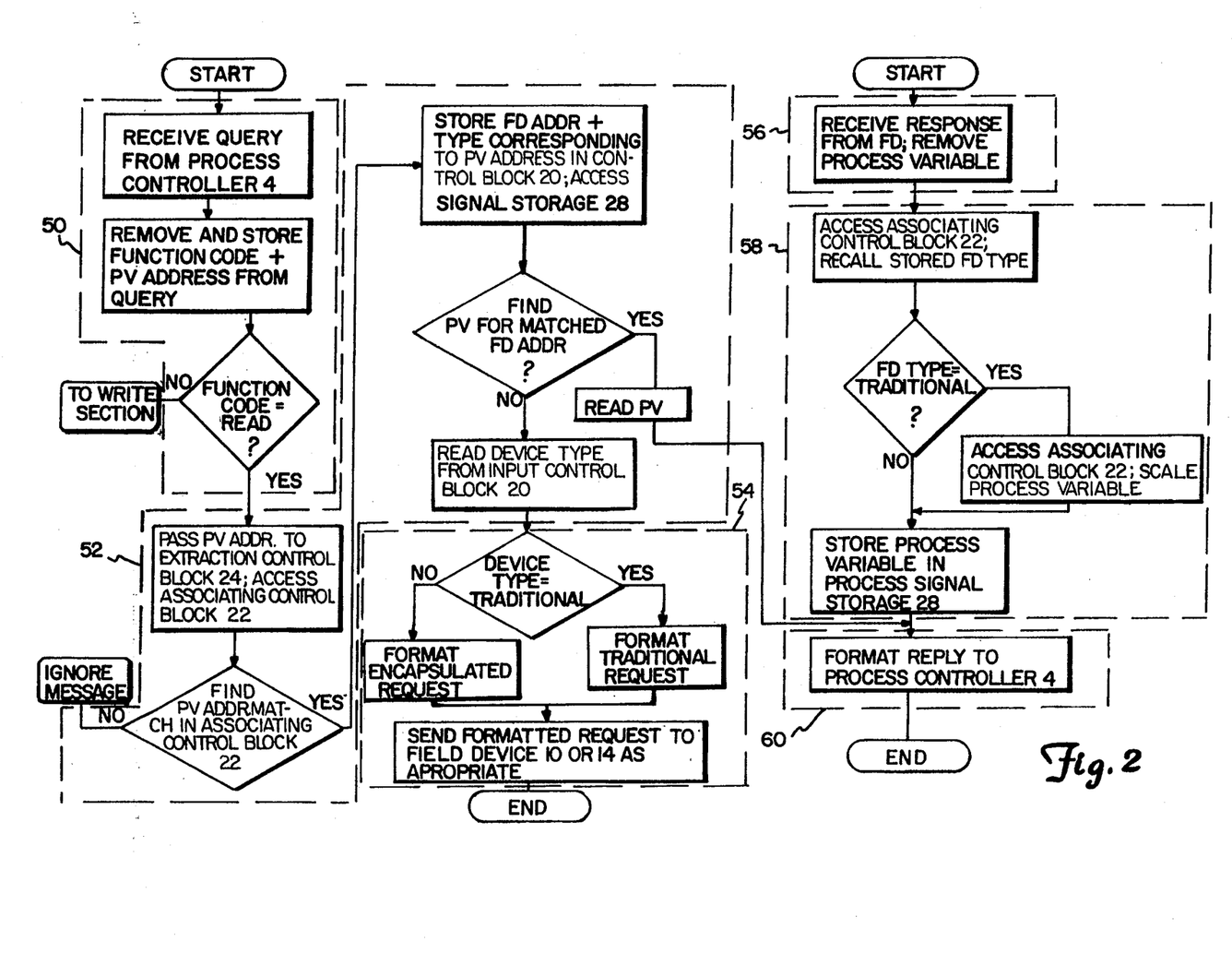
FIG. 2 shows a flow chart of communicator 6 operation.

FIG. 2 shows a detailed flow chart of the operation of communicator 6. At 50, input control block 20 receives process variable queries from process controller 4 through a RS-232 interface coupled to cable 8. Input control block 20 extracts and stores a function code and the PV address from the query in the storage circuitry of input control block input control block 20. The function code denotes either a read or a write command which is specific to the type of register on which the operation is to be performed. For example, function code 03 denotes an integer read operation and 65 denotes a floating point register read operation in a destination FD. If the function code is not a read operation, it is a write operation unless it is an invalid function code. At 52, extraction control block 24 searches the contents of associating control block 22 for the PV address matching the stored PV address. An error condition occurs if the PV address extracted from the query cannot be matched to an existing PV address. The FD address and type corresponding to the matched PV address is extracted and stored; then process variable storage 28 is searched for a match to the extracted FD address. If a process variable is recorded for the extracted FD address, the corresponding process variable is extracted. Otherwise, generating control block 26, at 54, format and send a process variable request as a function of the FD type. Generating control block 26 has a Mark-Space interface coupled to cable 12.

Process variable requests for traditional FDs are 16 bits long and comprise two data structures: 4 start bits and a 12 bit destination FD address. The destination FD address for a traditional device contains both a device designator and a register designator, as discussed above. Process variable requests for encapsulated devices have seven data structures arranged in the following order: 1 start bit, 1 data direction bit, 2 mode bits, 12 Mark-Space destination adress bits, a variable length "MODBUS" data structure, an 8 bit Mark-Space function code of 80H and a 16 bit checksum based on the entire message. The 12 bit Mark-Space address data structure contains a device designator and a register designator. HIU devices store process variables in an array of registers. The register number in the Mark-Space address is the numerical eqivalent to the register number in the HIU. This encapsulated message is hybrid in that the two ends of the message have Mark-Space data structures which surround the encapsulated "MODBUS" data structure. The process of translating the query into the encapsulated request does not alter the encapsulated "MODBUS" data structure; the encapsulated data structure is passed through the communicator. Consequently, communicator 6 can request process variables from any FD supporting a register-based messaging layer, such as "MODBUS" and a physical layer such as Mark-Space. Furthermore, future upgrades to the instruction set or to the existing register-based instruction set of existing FDs can be accommodated by the present invention without design changes.

The FD 10 or 14 whose address matches the destination address in the request sends a response comprising the requested PV back to storage means 20, which extracts the PV from the response, as shown at 56. A response to a traditional request is 40 bits long if level is reported and 56 bits long if temperature is additionally reported. The 40 bit reply comprises 3 start bits, 12 FD destination address bits, 22 bits representative of level, 2 hardware alarm bits and 1 parity bit. The 56 bit reply comprises 3 start bits, 12 Mark-Space address bits, 22 level bits, 2 hardware alarm bits, 16 temperature bits and 1 parity bit. In both cases, the FD address included in such response is the address of whichever field device which was sent the message. Furthermore, the process variable contained in either the 40 or the 56 bit reponse is extracted therefrom and stored in associating control block 22.

The response to an encapsulated request is of variable length but at least 72 bits. It comprises 1 start bit, 1 data direction bit, 2 mode bits, 12 FD destination address bits, a variable length "MODBUS" data structure representative of the requested process variable, 8 function code bits and 16 parity bit checksum based on the whole message. The process variable is extracted and stored in associating control block 22.

If the FD type is traditional, the process variable in the response is converted by conversion control block 30 within extracting control block using the following equation:

$$PV'' = MAXINT*[(PV-ZERO)/(FULLSCALE-ZERO)],$$

where MAXINT, ZERO and FULLSCALE are variables stored in associating means 22, PV' is the value of the requested process variable and PV" is the scaled process variable. TABLE 3 shows additional variable addresses stored in associating control block 22 and their meanings, as well as default values used at initialization. After conversion, the scaled process variable is stored in process variable storage 28, as shown at 58. Next at 60, a reply is formatted to process controller 4 using either the process variable retrieved from process variable storage 28 or from FDs 10,14. Communicator 6 responds to process controller 4 in the least amount of time when the process variable referenced in the process controller query is stored in process variable storage 28.

Communicator 6 operates in an autopolling mode when no process variable queries are being processed. Process variable requests are appropriately formatted for each FD address in associating control block 22 and the PV received in response to such request is stored in process variable storage 28. Each FD address which is stored in associating control block 22 is systemically accessed in like fashion so that process variable storage 28 is continuously updated.

Communicator 6 operates in an autolearn mode which loads the contents of associating control block 22, thereby establishing the correspondence between FD addresses, FD types and PV addresses. Autolearn mode is invoked by pressing a button inside communicator 6 or by sending messages from process controller 4 which write into associating control block 22. When invoked, all pending operations are suspended. Contents of associating control block 22 are initialized to default values shown in TABLE 2 and generating control block formats a process variable request for the first FD address as described above. If no reply is received, the FD address is incremented and a traditional process variable request is formatted for that address. If a reply is received, an encapsulated process variable request is issued, since the traditional response indicates that the process control device has at least traditional communications capabilities. If a response is received to the encapsulated message, the device type is stored as encapsulated in associating control block 22. If no response is received, the device type is stored as traditional in associating control block 22. This operation is repeated for those FD addresses in associating control block 22, which is at most 247. In either event, the numerical values of the PV address and the FD address are the same when associating control block 22 contents are loaded in the autolearn mode. Since there are a maximum of 247 "MODBUS" addresses, this mode limits the number of addressable FDs to 247. Autolearn mode simplifies installation of a process control system and is faster than other approaches. Furthermore, contents of associating control block 22 are loaded without a process controller, or if there is a process controller present, without the use of special configuration software in the process controller.

As an alternative to the autolearn mode, process controller 4 may load the contents of associating control block 22. Process controller 4 sends queries including various framing bits, a function code denoting a write, a destination address in associating control block 22 and the contents of such address. Although this mode requires more time than autolearn mode does to load associating control block 22, it is more flexible because the entire Mark-Space address space (0–999) can be mapped into the 247 "MODBUS" address space. As a result, this mode can access more FDs (1000) than the autolearn mode (247).

Figure 3:
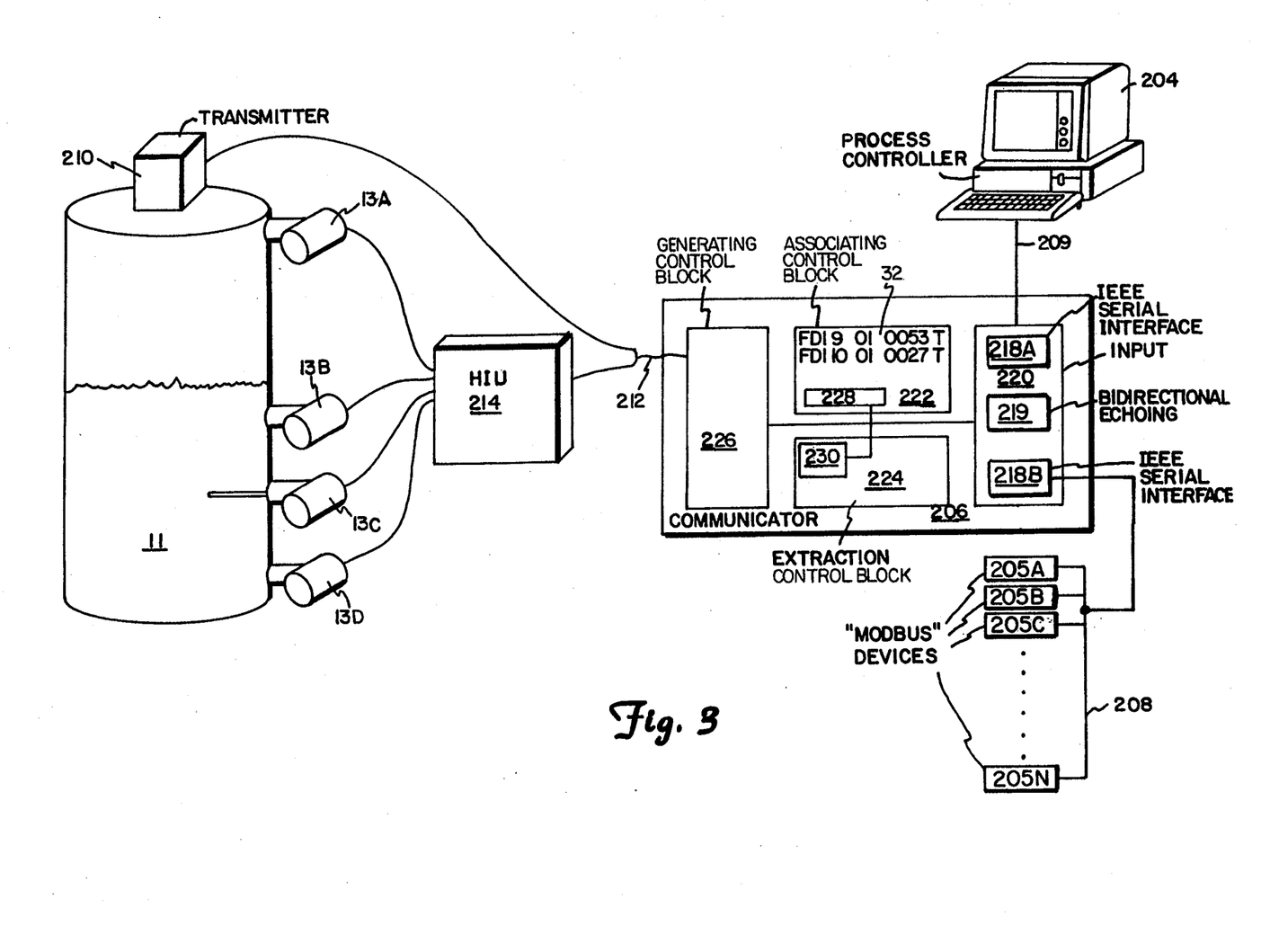
FIG. 3 shows a partial schematic of a segment of a process control application having a block diagram of a second embodiment of a communicator made according to the present invention, FDs, a process controller and multiple other devices.

In FIG. 3, a process controller 204 sends process variable queries in a "MODBUS" messaging layer to a communicator 206 over a RS-232 line 209. Communicator 206 sends process variable requests, messaged in both Mark-Space and "MODBUS", to FDs HIU 214 as many as 32 additional communicators, each sending process variable requests to as many as 48 FDs.

Additionally, echoing control block 219 offer means for translating between RS-232 and either RS-422 or RS-485 physical layers. As such, they effectively allow process controller 204 to communicate with devices 205A–N without additional hardware in the form of a RS-232 to R8-485 translator.

Communicator 206 also has associating control block 222 for storing FD addresses and their corresponding PV address and FD type. Process variable storage 228 is in associating control block 222 and stores the most recently updated PVs and their associated PV addresses. Extracting control block 224 is linked to input control block 220 and associating control block 222 for receiving the stored PV address and extracting a matching PV address and its corresponding FD address and type from associating control block 222. Generating control block 226 is linked to extracting control block 224 for formatting a request to a FD as a function of the device type, where the device type is received from associating control block 222.

TABLE 1

| FIELD DEVICE NUMBER VARIABLE NAME | | 1 | 2 | 3 ... 48 |
|---|---|---|---|---|
| | | | MEMORY LOCATION | |
| MODE | | 0100 | 0116 | 0132 .. |
| PV ADDRESS | | 0101 | 0117 | 0133 .. |
| FD ADDRESS | | 0102 | 0118 | 0134 .. |
| DEVICE TYPE | | 0103 | 0119 | 0135 .. |
| FIRST INTEGER REGISTER | | 0104 | 0120 | 0136 .. |
| NUMBER INTEGER REGISTERS | | 0105 | 0121 | 0137 .. |
| FIRST FLOAT REGISTER | | 0106 | 0122 | 0138 .. |
| NUMBER FLOAT REGISTERS | | 0107 | 0123 | 0139 .. |
| TRADITIONAL LEVEL ZERO | | 0108 | 0124 | 0140 .. |
| TRADITIONAL LEVEL FULL SCALE | | 0110 | 0126 | 0142 .. |
| TRADITIONAL TEMP ZERO | | 0112 | 0128 | 0144 .. |
| TRADITIONAL TEMP FULL SCALE | | 0114 | 0130 | 0146 .. | and level transmitter 210 over Mark-Space line 212. As many as 48 FDs may be connected to communicator 206. Process controller 206 also communicates in a "MODBUS" messaging layer to "MODBUS" devices 205A-N over a RS-485 cable 208. In this embodiment, line 209 carries RS-232 communications and line 208 carries RS-485 communications. Alternatively, line 208 carries RS-232 communications and line 209 carries RS-485 communications. The RS-232 line cannot be coupled to more than one "MODBUS" device, however Consequently, process controllers communicating in RS-232 or either RS-422 or RS-485 physical layers may be connected to communicator 206.

Communicator 206 is preferably implemented in microprocessor based circuitry having input control block 220, associating control block 222, extracting control block 224, and generating control block 226.

As part of input control block 220 for receiving process variable queries from process controller 204 and storing the PV address, a RS-232 interface 218A receives the query and couples it to bidirectional echoing control block 219 for echoing to a tristatable RS-485 IEEE serial interface 218B. Bidirectional echoing control block broadcasts communications received on the RS-232 interface 218A to the RS-485 interface 218B. When RS-232 interface 218A is active and sending a message, RS-485 interface 218B is tristated to avoid bus contention problems. As many as 32 other devices, including other communicators, may be connected to tristatable port RS-485. Consequently, bidirectional echoing control block 219 increases process controlling capability of process controller 204, since it may query

TABLE 2

| INFO TYPE | DESCRIPTION |
|---|---|
| MODE | Allowed values for this location are 0 and 1. A 0 enables autopolling and a 1 disables it. |
| PV ADDRESS | The PV ADDRESS is representative of a storage location containing a process variable in a FD in a FD network. |
| FD ADDRESS | Allowed values for this location are 0 through 999. There is one FD ADDRESS for each FD. The FD identified by the FD ADDRESS contains the storage location containing the process variable referenced by the PV address. |
| DEVICE TYPE | Allowed values for this location are 0 and 1. If 0, communicator 6 formats process variable requests to this FD in an encapsulated mode. If 1, process variable requests are formatted in a traditional mode. |
| FIRST INTEGER REGISTER | Allowed values are 0 through 65535. This value represents the first integer register in the FD containing a process variable. For example, HIU 14 may be configured to have effective mass in integer register 0037. |
| NUMBER OF INTEGER REGISTERS | Allowed values are 0 through 50. This value represents the number of integer registers after the FIRST INTEGER REGISTER which contain process variables. For example, HIU 14 may be configured to have 3 more process variables stored after register 0037, so that a 3 would be stored in this location. |
| FIRST FLOAT REGISTER | Allowed values are 0 through 65535. This value represents the first floating point register in the FD containing a process variable. For example, HIU 14 may be configured to have effective mass in integer register 0037. |
| NUMBER | Allowed values are 0 through 25. This value |

TABLE 2-continued

| INFO TYPE | DESCRIPTION |
|---|---|
| OF FLOAT REGISTERS | represents the number of floating point registers after the FIRST FLOAT REGISTER which contain process variables. For example, HIU 14 may be configured to have 3 more process variables stored after register 0037, so that a 3 would be stored in this location. |

TABLE 3

| ADDRESS | DESCRIPTION OF CONTENTS | VALUE |
|---|---|---|
| 0000 | Communicator Status. Where a 1 in the least significant bit indicates autolearn mode in progress, and bits set in the next three significant bits indicate various hardware failures. | |
| 0001 | Communications status bits | |
| 0002 | Number of locations in associating means 22 | |
| 0003 | Number of integer registers allowed in associating means 22 | |
| 0004 | Number of floating point registers allowed in associating means 22 | |
| 0005 | Maximum value of integer allowed for traditional FD (MAXINT) | 65535 |
| 0006 | Floating point traditional level 17 bit metric zero | 0 |
| 0008 | Floating point traditional level 17 bit metric full scale | 40 |
| 0010 | Floating point traditional level 18 bit metric zero | 0 |
| 0012 | Floating point traditional level 18 bit metric full scale | 40 |
| 0014 | Floating point traditional level English fractional zero | 0 |
| 0016 | Floating point traditional level English fractional full scale | 80 |
| 0018 | Floating point traditional level English decimal zero | 0 |
| 0020 | Floating point traditional level English decimal full scale | 80 |
| 0022 | Floating point traditional 1800 temperature (−199 to +199) zero | −200 |
| 0024 | Floating point traditional 1800 temperature (−199 to +199) full scale | 200 |
| 0026 | Floating point traditional 1800 temperature (−99 to +299) zero | −100 |
| 0028 | Floating point traditional 1900 temperature (−99 to +299) full scale | 300 |
| 0030 | Floating point traditional 1900 temperature (−799 to +799) zero | −800 |
| 0032 | Floating point traditional 1900 temperature (−799 to +799) full scale | 800 |
| 0034 | Software revision major digit | |
| 0035 | Software revision minor digit | |
| 0036 | Software revision transparent digit | |
| 0050 | Initiate autolearn mode. If 0, disabled. | |

What is claimed is:

1. An apparatus, comprising:
 means for receiving a query from a process controller, the query having a process variable address representing a storage location for process variable data in a field device in a network of field devices, each field device sensing conditions associated with process variables and storing process variable data representative of the conditions, each field device having a communication standard type and a unique field device address, the means for receiving including means for storing the process variable address;
 means for storing a plurality of records, each record including a field device address, a communication standard type, and a process variable address;
 means coupled to the means for storing the process variable address and to the means for storing a plurality of records for matching the process variable address stored in the means for storing the process variable address to a process variable address in a record stored in the means for storing a plurality of records and for extracting the field device address and the communication standard type from the record in the means for storing a plurality of records containing the matched process variable address; and
 means coupled to the means for matching for generating a field device request as a function of the extracted communication standard type, the field device request including the extracted field device address and being conveyable over a line communicating to the network of field devices to address the storage location represented by the process variable address stored in the means for storing the process variable address.

2. The apparatus as recited in claim 1 where the means for receiving further includes an IEEE serial interface for coupling to the process controller.

3. The apparatus as recited in claim 2 where the IEEE serial interface is selected from the group of IEEE serial interfaces definitions comprising RS-232, RS-422 and RS-485.

4. The apparatus as recited in claim 1 where the means for receiving further comprises an RS-232 IEEE serial interface and an RS-422/485 IEEE serial interface, both serial interfaces being connectable to the process controller.

5. The apparatus as recited in claim 4 where the means for receiving further comprises bidirectional echoing means for echoing a query received on one of the IEEE serial interfaces to the other IEEE serial interface and having a first end and a second end, the first end being coupled to the RS-232 IEEE serial interface and the second end being coupled to the RS-422/485 IEEE serial interface.

6. The apparatus as recited in claim 5 where one of the IEEE serial interfaces has tristatable outputs connectable to a common line between the apparatus and the process controller, and where the means for receiving further comprises means for tristating the tristatable outputs when the other IEEE serial interface is active and sending a query.

7. The apparatus as recited in claim 1 where the means for receiving receives queries formatted in a register-based messaging standard.

8. The apparatus as recited in claim 7 where the register-based messaging standard is "MODBUS".

9. The apparatus as recited in claim 1 where the means for generating further comprises a Mark-Space interface.

10. The apparatus as recited in claim 9 where the means for generating generates the field device request formatted in a Mark-Space messaging standard.

11. The apparatus as recited in claim 1 where the communication standard type associated with each field device is selected from the group of communication standards consisting of traditional and encapsulated.

12. The apparatus as recited in claim 1 where the means for receiving, means for storing a plurality of records, means for storing the process variable address, means for matching and the means for generating are implemented in microprocessor based circuitry.

13. The apparatus as recited in claim 1 where the means for storing the process variable address comprises a non-volatile memory.

14. The apparatus as recited in claim 1 where the means for storing a plurality of records comprises a non-volatile memory.

15. The apparatus as recited in claim 1 where the means for generating is further adapted to receive process variable data communicated over the line communicating to the network of field devices by the field device addressed by the field device request.

16. The apparatus as recited in claim 15 where the means for storing a plurality of records further includes memory means responsive to the means for generating for storing a most recent process variable data received from each field device.

17. The apparatus as recited in claim 16 where the means for matching further includes means responsive to the extracted field device address for extracting process variable data from the memory means.

18. The apparatus as recited in claim 17 where the means for generating, the means for matching, and the means for storing a plurality of records operate in an autopolling mode to update the memory means with process variable data corresponding to each associated field device address in the records stored in the means for storing a plurality of records.

19. The apparatus as recited in claim 17 where the means for generating is responsive to the means for extracting to inhibit generation of the field device request.

* * * * *

UNITED STATES PATENT AND TRADEMARK OFFICE
CERTIFICATE OF CORRECTION

PATENT NO. : 5,410,730
DATED : April 25, 1995
INVENTOR(S) : Randy J. Longsdorf et al.

It is certified that error appears in the above-indentified patent and that said Letters Patent is hereby corrected as shown below:

Col. 2, line 42, after "Extracting" insert --control block--.

Col. 5, line 64, please change "reponse" to --response--.

Col. 6, line 36, please change "systemically" to --systematically--.

Signed and Sealed this

Twenty-first Day of January, 1997

Attest:

BRUCE LEHMAN

Attesting Officer

Commissioner of Patents and Trademarks